March 2, 1954
O. A. NELSON
2,670,732
SURGICAL RETRACTOR
Filed Aug. 11, 1952
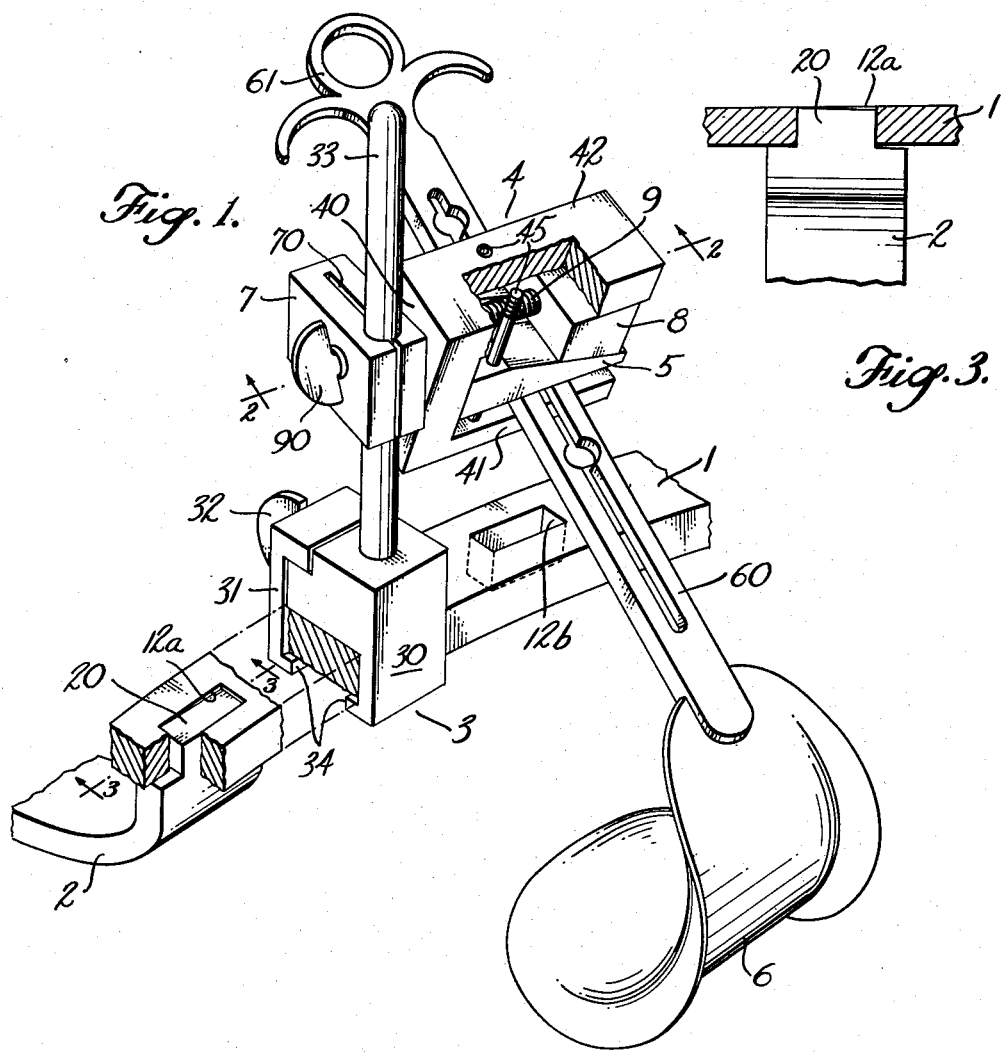
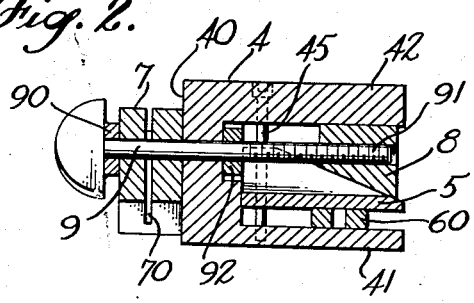
INVENTOR.
OLE A. NELSON
BY
Reynolds, Beach & Christensen
ATTORNEYS

Patented Mar. 2, 1954

2,670,732

UNITED STATES PATENT OFFICE 2,670,732

SURGICAL RETRACTOR

Ole A. Nelson, Seattle, Wash.

Application August 11, 1952, Serial No. 303,679

6 Claims. (Cl. 128—20)

This invention, like that disclosed in my copending application Serial No. 267,599, filed January 22, 1952, relates to a surgical retractor such as is used in certain abdominal operations, and in general constitutes an improvement on the invention disclosed in that application; it has for its general objectives the same objectives as were explained in that application, and produces all the advantages of that prior invention, with certain additional advantages attributable to the improvements which constitute the subject matter of this application.

The mounting means for the retractor instruments of the prior disclosure was designed primarily to clamp and hold in one of many possible fixed positions a retractor instrument which was formed with a round or rodlike shank. Many present day retractor instruments are provided with broad, flat shanks, and many surgeons who are accustomed to working with this particular style of instrument prefer not to change, and it is one of the objects of the present invention to provide a mount whereby such a flat-shanked instrument—and other styles as well—may be supported and held in any desired position of adjustment, with flexibility equal to the flexibility attainable with the round-shanked instrument and mount of the prior disclosure, thereby accommodating the surgical retractor as a whole to the employment of existing and preferred types of instruments.

The saving of time is of the utmost importance in such operations, which are sometimes lengthy at best, and it is a further object of this invention to provide such a retractor, and more particularly a mount for the retractor instrument, having the capabilities outlined above, and which will permit flexibility of adjustment of the retractor instrument into a large number of positions, and which nevertheless will enable the free positioning, and then the clamping and fixing of the retractor instrument in its attained position of adjustment, by the simple operation of tightening a single bolt or equivalent securing means, rather than by several sequential and necessarily coordinated adjustments.

In addition to flexibility of adjustment and rapidity of securement in a desired position, fixity of positioning and sureness of retention in adjusted position are naturally important objects in such a surgical retractor, and it is a further object to provide a construction of mount, for cooperation with a base ring, of such nature that freedom of adjustment or of assembly and dismounting is in no wise impeded, but assurance of maintenance in a fixed position is materially improved.

It is desirable that a base ring, such as is employed in a surgical retractor of this nature, lie closely adjacent the patient's abdomen. Some patients are more paunchy than others, and when this is the case the ideal situation would be to incline the plane of the supporting base ring conformably to the slope of the abdomen. It is an object of the present invention to provide a ring and a mount therefor which will enable the adjustment of the ring to a selected angle of inclination, and yet in any such angle will hold the ring firmly and surely in its fixed position, for it constitutes the base of the retractor as a whole.

It is, of course, an object to provide a surgical retractor having the advantages and capabilities outlined above, which will be of simple construction, readily taken down and readily set up, and capable of being thoroughly sterilized in all its parts.

With such objects in mind, and others as will appear more fully hereinafter, the present invention comprises the novel surgical retractor as a whole, and the novel mount for a retractor instrument as part of such a surgical retractor, all as shown in the accompanying drawings and as will be more fully explained and defined hereinafter.

In the accompanying drawings the invention is shown embodied in a typical and representative form such as is presently preferred by me.

Figure 1 is an isometric view of a mount for a retractor instrument incorporating the instrument itself, and illustrating so much of the circular base ring and its bracket support as is necessary to make clear its relationship in the whole; parts of the instrument and of the base ring are broken away for better illustration of interior details.

Figure 2 is a section generally along the line 2—2 of Figure 1, along the axis of the clamping bolt, and illustrating the details thereof, and Figure 3 is a detail section along the line indicated at 3—3 in Figure 1, illustrating the manner in which the base ring is tiltable into yet rigidly held in an inclined plane.

As is explained more fully in the companion application Serial No. 267,599, the base ring 1, which is preferably of flat circular shape, is supported above and generally parallel to an operating table through the medium of brackets 2, one at each side of the ring, which are fixedly supported in a selected position alongside the respectively opposite sides of the operating table.

At their upper ends the brackets are formed with reduced and shouldered tips 20, preferably of rectangular shape, which are received snugly in similarly shaped apertures at diametrically spaced points of the ring. The support of the ring is the same in this invention, modified, however, by the provision of a plurality of apertures 12a, two of which (one at each side) may be oriented directly perpendicular to the plane of the circular ring as a whole, another pair 12b of which may be oriented at a slight inclination to the plane of the ring, another pair of which may be oriented at a slightly greater inclination, and so on, so that by engaging the tips 20 in a selected pair of apertures the ring may be fixedly and solidly supported at the correct slope for use with the particular patients.

The retractor instrument shown in the drawing is a known type and style, and is selected as typical of many such styles of instrument of this and other types that are now in common use. It consists of a broad flat shank 60 integrally mounting at one end a blade 6, the shape of which in different types of instruments will vary in accordance with the nature of the work it is to perform. Fingerholds 61 are provided at the end distant from the blade. The invention is concerned primarily with the provision of means to mount such a retractor instrument, but other styles as well, solidly upon and in a given position of adjustment with relation to the base ring 1.

A base block generally designated by the numeral 3 is preferably formed in two parts 30 and 31, which are movable relative to one another under the influence of a clamping screw 32 so that conjointly they rest upon the base ring 1, and may slide around the ring into any position of adjustment about the ring. In a selected position the base is clamped and held to the ring, and thereby positions an upright post 33 in some one fixed position of adjustment. Since that post is the ultimate support of the retractor instrument, and is subject to a lateral pull, it is desirable to insure that the post may not be pulled or toppled over and so disengaged from the ring, and to that end each of the parts 30 and 31 is flanged inwardly immediately beneath the ring 1, as indicated at 34, and so when clamped tightly is locked to the ring to prevent the possibility of being accidentally toppled over.

The upright post 33 is preferably of round cross section. A clamping block 7, preferably formed in one piece with a split, as indicated at 79, and with an aperture of a shape to embrace the post 33, is mounted upon the post to rotate about it and to slide up and down along it. Means are provided to clamp the clamping block 7 to the post and to hold it in any given position of adjustment, but a description of these means will be deferred.

A yoke 4, preferably of U-shape, has a flat surfaced base, as indicated at 40, which bears against a side face of the clamping block 7, and the yoke as a whole is pivotally mounted upon the clamping block, again by means which will be described more fully hereinafter, so as to tilt about an axis which is generally normal to the axis of the post 33. The yoke is formed with at least one arm directed generally parallel to this pivot axis, as is indicated at 41, which constitutes and will be referred to hereinafter as a fixed jaw, and the inner face of which is planar. If the yoke is of U-shape, as it is preferred it be, it has also a second arm or jaw 42 which is opposite the arm 41, and the inner face of that, also, is planar.

In spaced relation to the fixed jaw 41 is a movable jaw 5. This is guided, as, for instance, by guide pins 45, for movement towards and from the fixed jaw 41, with which it cooperates to clamp and hold the shank 60 of the retractor instrument. The facing surfaces of the jaws 41 and 5 are parallel. Incidentally, the fixed jaw may be lowermost in use, as shown, or uppermost, if preferred.

The means to force the jaw 5 toward the jaw 41 for such clamping action may take various forms, and may be variously actuated. Preferably the actuating means incorporates a cam. More specifically, and preferably, the cam is in the form of a wedge block 8, one surface of which is inclined to cooperate with a complementally inclined surface of the movable jaw 5, as is best shown in Figure 2. In this arrangement the wedge block 8 has an opposite planar surface which bears against and reacts from the inner planar surface of the yoke's arm 42, and suitable means are provided for actuating this clamping means or cam device, and specifically for guiding and moving the wedge block 8 lengthwise of the yoke 4.

It can now be recalled that there must be a means for clamping the clamping block 7 to the post 33. There must be a means to pivotally mount the yoke 4 upon the clamping block 7. There must be a means to hold the yoke relative to the clamping block 7 in any position of rotative adjustment about the axis of rotation. There must be a means to force the movable jaw 5 towards the fixed jaw 41 for clamping, and to hold it in such adjusted position, or alternatively to permit the movable jaw to move away from the fixed jaw for release, and there must be means to guide the wedge block 8 for movement generally in the plane of and lengthwise of the yoke.

Such functions might be performed by separate or independent devices, but preferably all are performed by a single element, namely the bolt 9, which has an enlarged head at 90 that bears against one face of the clamping block 7, and which is threaded at its opposite end, as indicated at 91, where it is received in a complementally threaded hole in the wedge block 8.

The adjustment of the base block 3 into the general vicinity of its final position about the ring is first accomplished, and then with the clamping block 7 loosely embracing the post 3, and with the shank 60 of the instrument loosely embraced between the jaws 5 and 41, the retractor blade 6 is brought into operative relationship to the margin of the wound, and is moved to the position it is desired it should occupy finally. When it is in the proper position, rotated about the axis of the bolt 9, slid between the jaws lengthwise of the shank, and of the jaws, to the proper extent, rotated laterally in the jaws to the desired extent, elevated to the correct height on the post, and rotated about the post to the correct rotated position—when all these six adjustments have been made—then, and only then, is the bolt 9 tightened up, and by this single operation all parts are held in the attained position of adjustment with relation to the base block 3 and are retained firmly in that adjusted position. Tightening of the bolt urges the wedge block 8 to the left, as seen in Figures 1 and 2, and by reaction from the arm 42 urges the movable jaw 5 toward the fixed jaw 41. By reaction against the wedge block 8 through the bolt 9, the bolt's head 90 is urged against the left hand face of the clamping block 7, and since the right hand face of the clamping block 7 is urged, through the action of the wedge block and bolt upon the yoke 4, to the left against that face of the clamping block, the pressure of the bolt head 90 at the left of the clamping block tightens the clamping block upon the post 33, and urges together the face 40 of the base of the yoke and the contacted face of the clamping block 7, so that the yoke is held in its rotated position of adjustment.

While it would be entirely feasible to remove the wedge block 8, the movable jaw 5, and the bolt 9 for purposes of cleansing and sterilizing, it will ordinarily be satisfactory to retain the bolt 9 in place by the use of a retaining collar 92 fitted upon it within the yoke, and to guide the movable jaw 5 permanently upon the pins 45, although the latter may themselves be removably mounted, if preferred.

I claim as my invention:

1. In a surgical retractor, in combination with a base and a fixed support therefor to locate the base in general parallelism with the margin of the patient's wound, an upright post supported rigidly with respect to and upstanding from said base, a retractor instrument including a blade and a shank, a pair of laterally directed shank-engaging jaws, one fixed and the other movable relative thereto, a clamping block embracing said post for sliding therealong and for rotation thereabout, a laterally directed bolt headed at one end and threaded at its other end, and passing through the clamping block with its head bearing against a side face thereof, a yoke bearing against the opposite side face of the clamping block, the bolt passing also through the yoke to constitute a pivot therefor, and the fixed jaw constituting part of said yoke, and a wedge block threaded upon said bolt, reacting between said yoke and the movable jaw to force the latter towards the fixed jaw, to clamp the shank of the retractor instrument between said jaws, and simultaneously to press the yoke against the clamping block and to clamp the latter about the post, and so to hold all parts in their attained positions of adjustment.

2. A surgical retractor as in claim 1, wherein the base is formed as a ring having parallel inner and outer margins, and wherein the post is formed as a separate piece from the base, a base block resting upon the ring and formed in two parts, whereon the lower end of the post is secured, a connecting clamping screw intermediate the two parts of said base block to secure the latter in any position shifted about the base ring, said two parts embracing the respectively opposite margins of the ring, and flanges inwardly directed from each such part, positioned immediately beneath the ring when parts are in ring-clamping position, to prevent the post from toppling from its upright position.

3. A surgical retractor as in claim 1, wherein the base is formed as a circular ring having several through apertures in diametrically disposed pairs distributed about it, and the fixed support for the base ring is formed as two upright brackets fixedly located at opposite sides of the ring, each terminating at its upper end in reduced tips of a size to be snugly received in the respective apertures of a pair in the ring, the several pairs of apertures being of varying inclination relative to the plane of the ring, to fixedly locate the ring at a selected inclination relative to the horizontal.

4. A mount for a surgical retractor instrument such as includes a blade and an integral shank, which mount comprises an upright post, a clamping block embracing said post and both rotatable about and slidable up and down the post, a yoke bearing against one side of said clamping block, and formed with a laterally directed fixed jaw, a movable jaw, means interengageable between the yoke and the movable jaw guiding the latter for movement in a definite path towards and from the fixed jaw, a wedging means reacting between the yoke and said movable jaw to force the latter towards the fixed jaw, and a headed bolt passing through said clamping block and as a pivot through said yoke, and operatively connected to said wedging means to move the latter, the head of said bolt bearing against that face of the clamping block which is opposite the yoke, and by reaction from such bearing face urging the wedging means towards jaw-closing position, to clamp the shank of a retractor instrument which is located between the jaws, and to urge the yoke against the clamping block, and so to retain all components of the mount fixedly in adjusted position upon said post, and the blade of the retractor fixed in adjusted position.

5. A mount for a surgical retractor instrument, as defined in claim 4, wherein the yoke is U-shaped and bears at its base against the clamping block, and the movable jaw is located intermediate the arms of the U and is guided for movement towards a first such arm which constitutes the fixed jaw, and wherein the bolt is threaded and the wedging means includes a wedge block threaded to receive the threaded end of the bolt, which wedge block reacts between the second arm of the yoke and the movable jaw, as the wedge block is moved by the bolt in a direction lengthwise of the yoke, to shift the movable jaw towards and from jaw-closed position.

6. A mount for a surgical retractor instrument as defined in claim 5, wherein the inner surfaces of the yoke's arms are flat and lie in parallel planes, normal to the plane of the outer surface of the base of the yoke that bears against the clamping block, and the clamping surface of the movable jaw is flat, complementally to the flat inner surface of the fixed jaw, and the opposite bearing surface of the movable jaw is inclined lengthwise, and wherein the wedge block is formed with a surface bearing against and inclined complementally to the inclined surface of the movable jaw, and its opposite surface is planar and bears against the planar inner surface of the second arm of the yoke.

OLE A. NELSON.

References Cited in the file of this patent

UNITED STATES PATENTS

| Number | Name | Date |
|---|---|---|
| 1,230,873 | Crossley | June 26, 1917 |
| 1,710,377 | Niflot | Apr. 23, 1929 |
| 1,747,799 | Straus | Feb. 18, 1930 |
| 2,365,935 | Boggs | Dec. 26, 1944 |